---

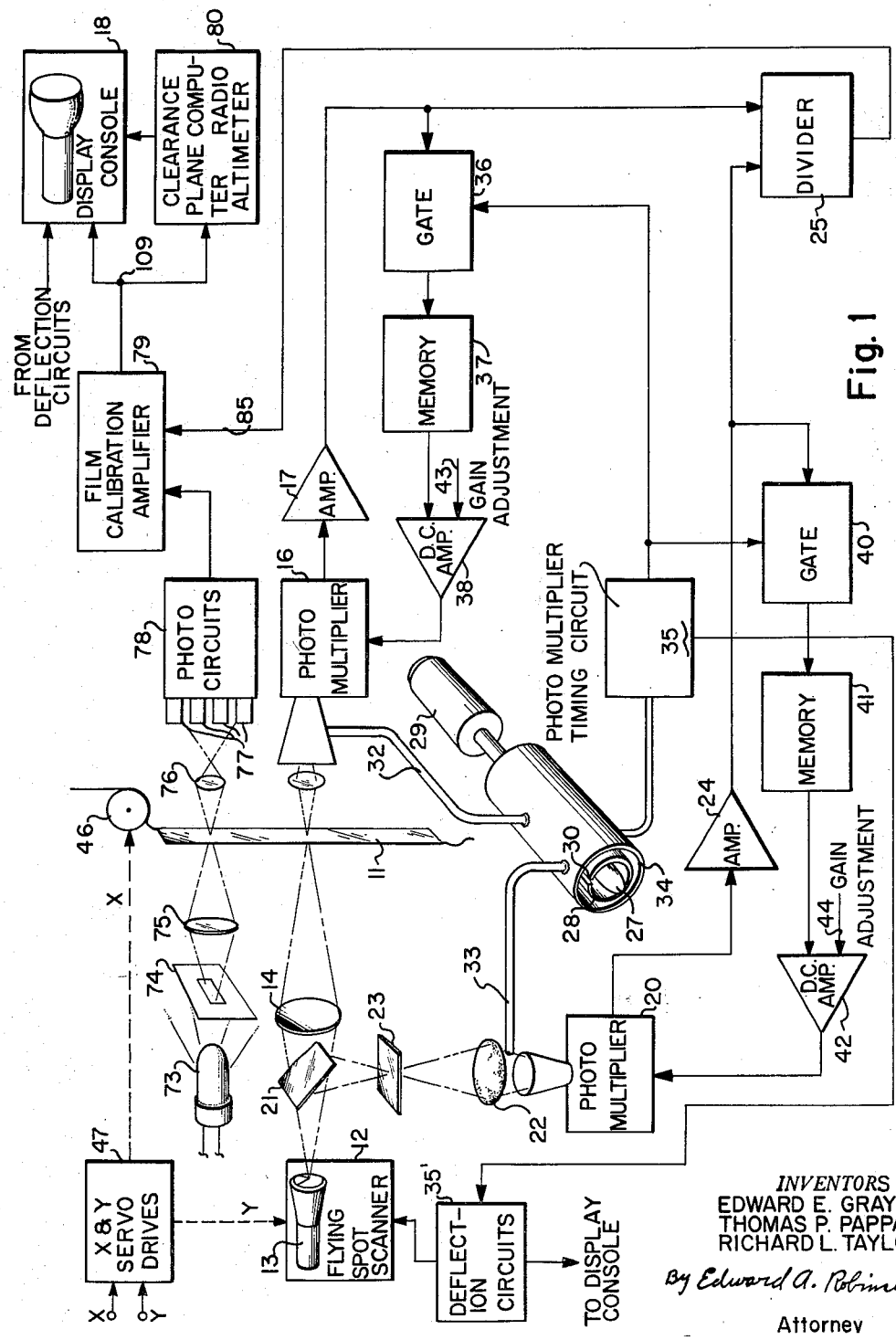

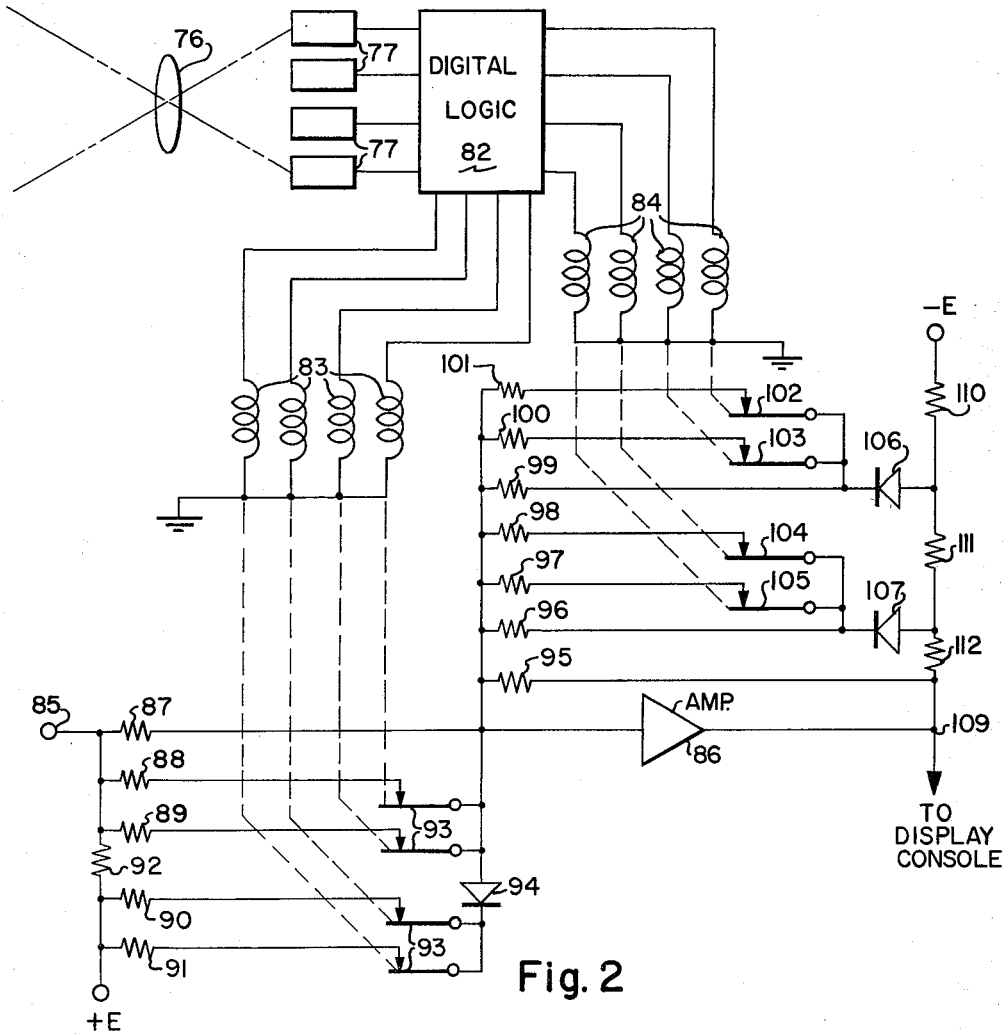
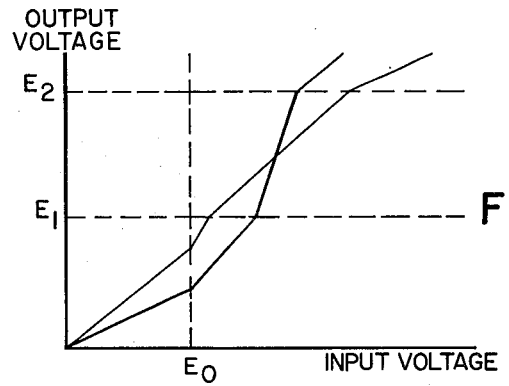
Fig. 3
INVENTORS
EDWARD E. GRAY
THOMAS P. PAPPAS
RICHARD L. TAYLOR
BY Edward A. Robinson
Attorney

United States Patent Office 3,113,989
Patented Dec. 10, 1963

3,113,989
TERRAIN RADAR SIMULATION
Edward E. Gray, Mountain View, Thomas P. Pappas, Sunnyvale, and Richard L. Taylor, San Jose, Calif., assignors to General Precision, Inc., Binghamton, N.Y., a corporation of Delaware
Filed July 8, 1960, Ser. No. 41,522
7 Claims. (Cl. 35—10.4)

This invention relates to apparatus for training personnel in the operation of aircraft radar equipment, and more particularly this invention relates to apparatus for simulating a radar display of terrain information. A co-pending application for United States Letters Patent entitled "Radar Simulation," Serial No. 41,564 filed on July 8, 1960 by Mr. Edward E. Gray, Mr. Keith E. McFarland and Mr. Kenneth R. Hackett now Patent No. 3,031,774 issued May 1, 1962 claims a related invention concerning the terrain radar simulation as disclosed herein.

Grounded apparatus for teaching and practicing aircraft navigation, or the like, is well-known in the art and because of its economy in time and material, and the elimination of hazards of airborne teaching, such apparatus is currently widely used. Such apparatus may comprise generally, a unit which simulates or represents an airplane and has a seat(s) for the student(s) positioned relative to an instrument panel with a complement of instruments simulating the aircraft performance instruments of a plane. Training apparatus may include simulation of any equipment, normally installed in an aircraft including auxiliary apparatus such as radar.

It is an object of this invention to provide an improved radar simulation wherein a cathode ray tube may display terrain features such as hills or mountains in a manner similar to an actual display by operative radar equipment carried by an aircraft in flight, and wherein the terrain information is recorded on a photographic surface which may be scanned by a pick-up device.

A further object of this invention is to provide a photographic surface wherein shades of gray may indicate terrain contours and elevations, and wherein a standard gray scale is provided for digital calibration of specific areas of the surface to correct for variations in the photographic processing of the surface.

Another object is to provide a digital pick-up means for receiving a digitally coded calibration signal corresponding to variations in the processing of the photographic film for correcting the video signals in accordance with the calibration signal thus picked-up.

Numerous other objects and advantages will be apparent throughout the progress of the specification which follows. The accompanying drawings illustrate a certain selected embodiment of the invention and the views therein are as follows:

FIGURE 1 is a schematic diagram of the optical systems and electrical circuits of the apparatus of this invention;

FIGURE 2 is a further schematic diagram of the photo circuits and film calibration circuits shown as blocks in FIGURE 1;

FIGURE 3 illustrates sample film correction curves obtainable from the apparatus of FIGURE 2;

Figure 4:
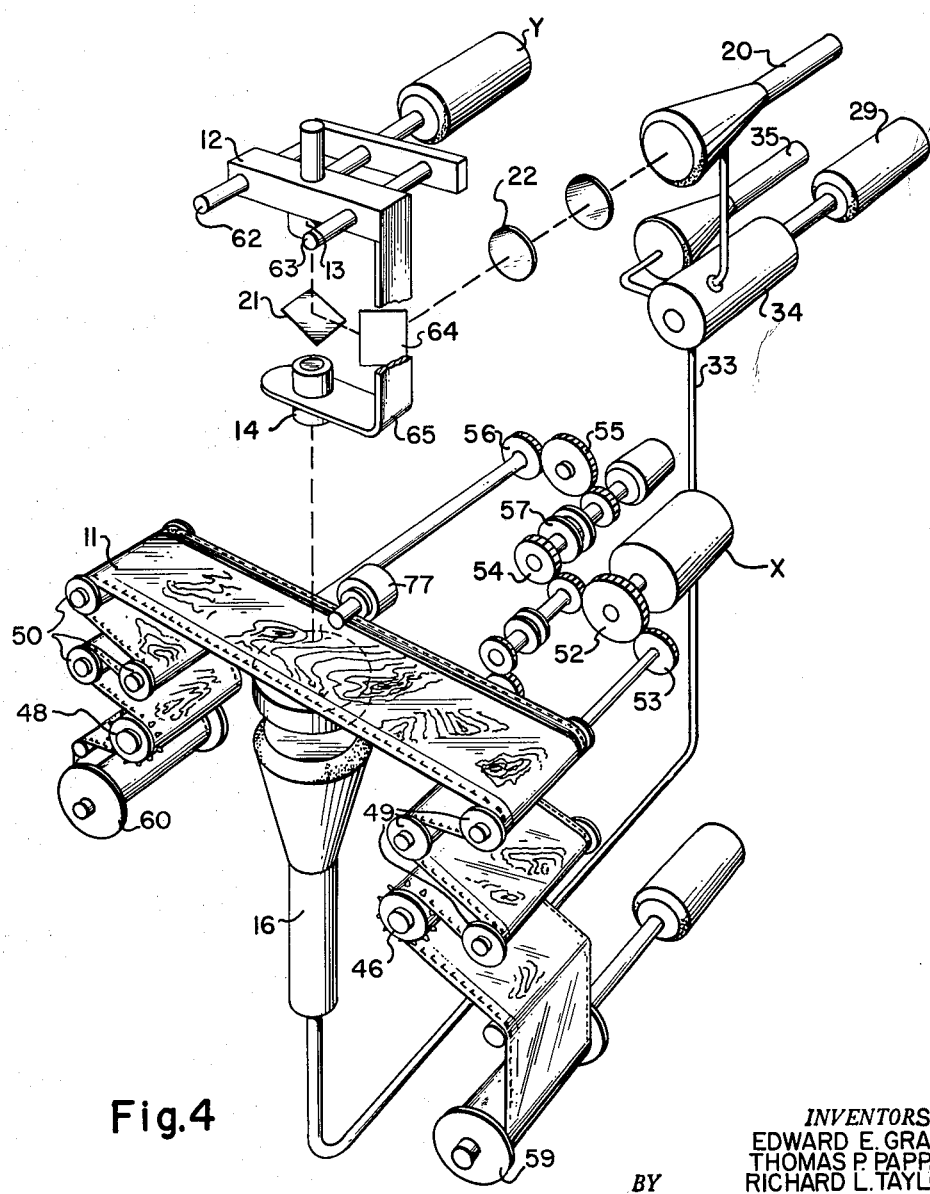
FIGURE 4 is a diagram of film transport apparatus and the optical systems of this invention.

Briefly stated, according to this invention, a photographic surface or film strip 11 is scanned by means such as a flying spot scanner 12 having a cathode ray tube 13 for generating a spot of light which is focused upon the film strip 11 by optical means 14. The film strip includes a map section wherein various shades of gray represent contour elevations, and a photosensitive pick-up means such as a photo-multiplier 16 develops a video signal from the scanning of the film strip 11. The video signal is passed by an amplifier 17 and other circuits ultimately to a display console 18 including means such as a cathode ray tube for reproducing a simulated radar display. Means are provided for calibrating or correcting the video signal to compensate for variation in film density or grayness pattern resulting from photographic processing thereof.

The flying spot scanner 12 develops a spot of light on the face plate of the cathode ray tube 13 in a conventional manner by an electron beam impinging upon a phosphor layer. Because phosphors are granular, the layer is somewhat non-uniform, and therefore, the light emission is likewise non-uniform as the electron beam scans across the layer. The means provided for correcting or calibrating the video signal to compensate for the non-uniform light emission includes another photo-multiplier 20 optically arranged for directly sampling the light output of the flying spot scanner 12. The optical system associated with the photo-multiplier 20 may include a beam splitter or dichroic mirror 21, a lens 22 and a means for attenuating the light such as a clear film panel 23. The output from the photo-multiplier 20 is passed by an amplifier 24 to an analog dividing circuit 25. The dividing circuit 25 receives the video signal from the elevation read-out channel including the amplifier 17 together with the signal from the photo-multiplier monitor 20, and performs an analog division such that the elevation video signal is attenuated by an amount corresponding to the instantaneous brightness of the flying spot scanner. The signal passed from the analog dividing circuit 25 corresponds to an elevation video signal which may have been developed directly had the flying spot scanner 12 produced a constant light output, and therefore, the circuitry including the photo-multiplier 20 and the divider 25 constitutes a means for compensating for variations in the illumination from the scanning means 12.

The photo-multipliers 16 and 20 are inherently subject to drift variations such that the electrical signal developed for a given light input tends to vary slowly or drift. A synchronized means for periodically correcting drift variation and re-calibrating the photo-multipliers is provided by a standard source of illumination 27 optically coupled to both the photo-multipliers 16 and 20. The illumination source may be a tube placed within a cylinder 28 which is mechanically coupled to and rotated by a synchronous motor 29. The cylinder 28 is generally opaque but has a longitudinal extending transparent slit or opening 30 therein. It may be appreciated that a flat beam or plane of light will be emitted and will sweep about the cylinder 28 as it rotates. A pair of light pipes or Lucite rods 32 and 33 connect with appropriate ports in an outer housing 34 surrounding the rotating cylinder 28 and constitute the means for passing light from the standard light source to the photo-multipliers 16 and 20. Obviously, the light passed to the photo-multipliers is synchronized with the rotation of the cylinder 28 and will appear upon the photo-multiplier circuits during re-trace intervals when the flying spot scanner 12 and the display console 18 are blanked out and rendered inoperative.

The housing 34 contains a pair of ports for passing light to the photo-multipliers 16 and 20 and contains a port and further optical arrangement for passing light to a third photo-multiplier and timing circuit 35. The photo-multiplier circuit 35 receives pulses of light synchronized by the cylinder 28 and functons to generate electrical timing pulses for the remainder of the circuitry. Timing pulses from the circuit 35 are passed to deflection circuits 35' wherein deflection signals are generated for both the flying spot scanner 12 and the display console 18. Further timing pulses are passed to AND gates 36 and 40 whereby the gates are conditioned to pass signals during particular times with respect to the rotation of the cylinder 28 and the deflection signals. Therefore, the rotating cylinder 28 constitutes a master timing means for generating timed illumination pulses both for calibration of the photo-multipliers 16 and 20 and for generation of electrical timing pulses.

During re-trace intervals the standard illumination from the source 27 causes the photo-multipliers 16 and 20 to produce an output voltage for calibration purposes—which output voltage is passed by the respective amplifiers 17 and 24. During the re-trace intervals, the AND circuit or gate 36 is conditioned to pass the signal from the amplifier 17 to a feedback circuit including a memory device 37 and a direct current amplifier 38 to control a dynode voltage of the photo-multiplier 16. Since the voltage output from a photo-multiplier depends largely upon the acceleration voltages applied to dynodes or secondary emissive elements, a gain control may be provided for the photo-multiplier by control of the dynode voltages. Therefore, the signal level passed from the photo-multiplier 16 during re-trace intervals is fed back through a memory device 37 and an operational amplifier 38 to control the gain of the multiplier and to effectively establish the output voltage therefrom at a pre-set value. The memory device 37 may be a simple resistance-capacitance integrating circuit for storing a voltage from one re-trace interval to the next. During a re-trace interval, when the gate 36 is conditioned to conduct, the feedback circuits 36, 37 and 38 become operative to establish a desired output voltage from the photo-multiplier 16 whereupon an appropriate feedback voltage is stored in the memory circuit 37. Between re-trace intervals the gate 36 is rendered non-conductive, and the feedback voltage to control the dynodes of the photo-multiplier is merely retained in the memory 37. Thus, the photo-multiplier is calibrated during the re-trace times when both the flying spot scanner 12 and the display console 18 are blanked out and rendered inoperative.

The photo-multiplier 20 is likewise subject to drift variation, and therefore, a similar feedback circuit is provided to stabilize the output voltage therefrom. This feedback circuit includes the gate 40, a memory circuit 41 and an amplifier 42. In both feedback circuits the amplifiers 38 and 42 respectively include a manual gain adjustment 43 and 44 for establishing a desired output level.

As indicated heretofore, elevation contour information is processed on a film strip wherein various shades of gray represent various elevations. Since this apparatus simulates radar display as an airplane moves, means are provided for moving the film 11 with respect to the flying spot scanner. The forward motion of the aircraft may be considered as an X direction and such movement may be accomplished by passing the film 11 over a drive roll 46 under the control of a servo drive generally shown as a block 47 (FIG. 1). Thus, the velocity of the drive roll 46 is controlled by an X servo mechanism from an X input and may be derived from simulating flight control of the training apparatus (not shown). Although the simulated flight path is generally longitudinal or in the X direction with respect to the film, such flight path may deviate from the ideal center line of the film whereupon a Y drive component may be introduced. The Y drive or transverse movement is accomplished by physically moving the flying spot scanner 12 and its associated optical system 14 transversely with respect to the film 11.

As shown in FIGURE 4, the film 11 is trained about a pair of sprocket drive rolls 46 and 48 together with idler rolls 49 and 50 on each side of the photo-multiplier 16. A first drive motor X accomplishes movement of the film through a pair of gears 52 and 53 which drivingly couple the motor X to the sprocket roll 46. Reversal of the film may be accomplished since the motor X is also coupled to the drive sprocket 48 via the gears 52, 54, 55 and 56. A safety clutch 57 may be included in the drive arrangement. A pair of reels 59 and 60 will feed film to and take up film from the respective drive sprockets 46 and 48.

A linear motor Y is directly connected to move the flying spot scanner carriage 12 along a pair of ways 62 and 63. The beam splitting dichroic mirror 21 and the lens 22 together with another mirror 64 are supported by a bracket 65 fixed to the flying spot scanner carriage 12.

Figure 5:
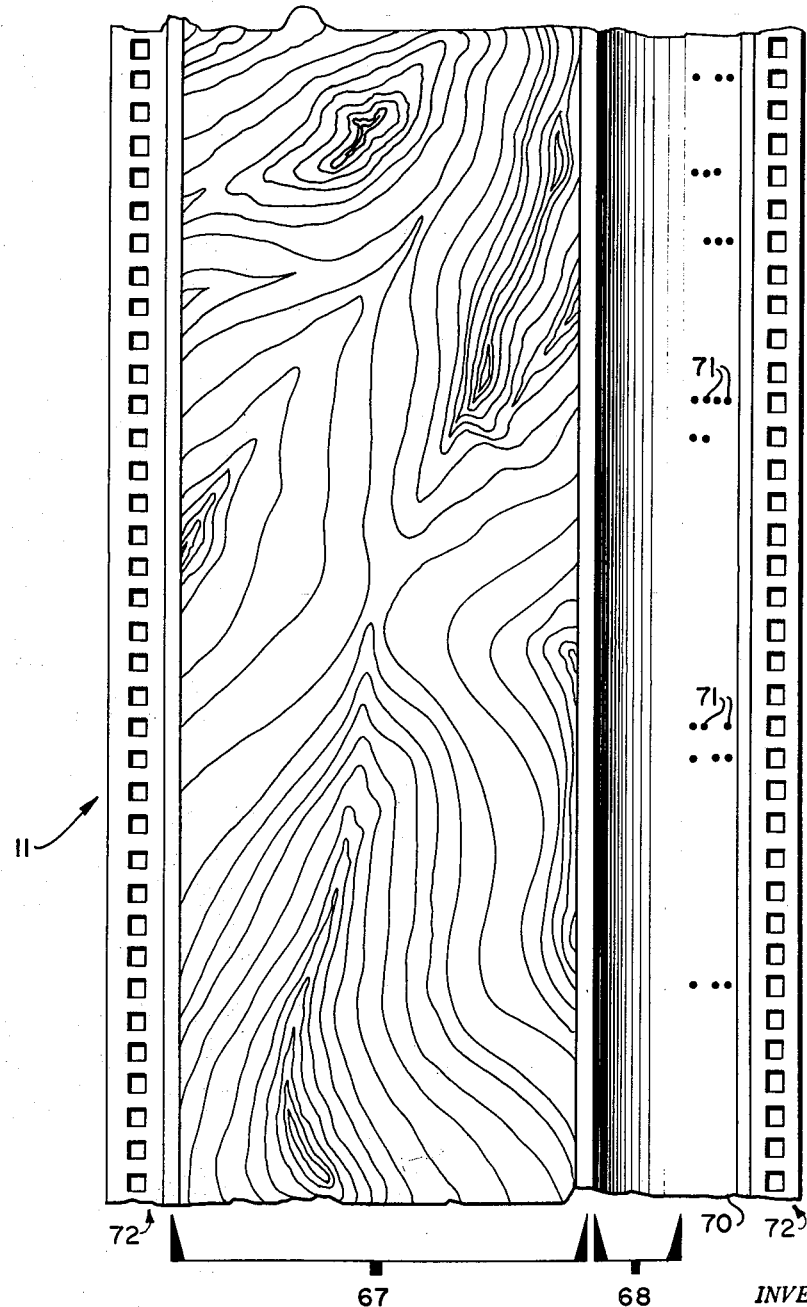
FIGURE 5 illustrates an enlarged portion of the photographic surface or film used in this apparatus.

FIGURE 5 shows a section of the film 11, and it is to be noted that a principal area 67 represents a map with contour lines appearing thereon. The area 68 constitutes a gray scale band and contains standard contours extending longitudinally of the film.

The map portion of the film may be prepared by a successive stripping technique. This technique is fully described in a bulletin entitled "Dystrip Technique of Color Separation" by the Aeronautical Chart and Information Center, Air Photographic and Charting Service (MATS). Generally this technique involves photographing contour lines from a map onto a negative, and then hand stripping the emulsion from the film in particular areas representative of elevations. The stripping process is alternated with an exposure of the final film strip through the "windows" or specific openings of the stripped away material from the negative and then to darken a positive film overlying the negative. After each successive exposure of the diapositive transparency, a further contour elevation area may be stripped from the negative. The areas of highest elevation will be first stripped from the negative and first exposed upon the positive film. Successive exposures of the positive will include successively lower elevations together with the higher elevations which have been previously exposed. Therefore, the diapositive film map area will be longer exposed and darker in those regions of high elevations while the regions of low elevations will be lighter in character. The mountain tops will be black and the low valleys will be white with various shades of gray representing elevations therebetween.

Since photographic film processing techniques are subject to density vairations, the radar simulation apparatus of this invention provides a means for electronic compensation of the signals picked up from the film strip. The gray scale band area 68 (FIG. 5) is photographically processed together with and identical to, the map area 67. The darker portion of the gray scale band on the left side thereof corresponds with the highest elevations or mountain peaks of the map area and the contour gradation extends across the gray scale band such that the right side thereof corresponds to the lowest elevations of the map. It would be possible to determine the elevation of any point on the map by a comparison with the grayness value of that point to the gray scale representing standard elevations, since the photographic processing was the same in both cases and any grayness error resulting from the processing would appear both on the map and on the gray scale. Although the map elevations may be obtained by direct comparison with the gray scale this invention contemplates a digital calibration of the film.

An area or band 70 extending along the right side of the film strip (as shown in FIGURE 5) includes four tracks for digital indicia which may appear as opaque dots 71. The indicia 71 constitutes a four-bit coded representation corresponding to a grayness characteristic of the film as it may be scanned from one side of the gray scale 68 to the other. This grayness characteritsic is generally non-linear and results from many variables of photography and associated with the film processing. Further incorporated in this characteristic may be the pick-up response characteristic of the photo-multiplier 16, and the output response characteristic of the display console 18. Thus, the digital value represented by the four-bit code 71 is initially obtained by examination of the gray scale band, is representative of the non-linear characteristics of the photographic film and further includes characteristics of the photo-multipliers and display console.

The gray scale area 68 is used to establish the digital coding bits 71 corresponding to variation in film density, and once the coding 71 is established, the gray scale band 68 is of no further value. It has been suggested that the gray scale be positioned on each side of the film at the extreme edges thereof. After the film has been developed and the digital coding 71 established, a final operation is to cut the sprocket holes along the edge. Thus, the edge portion 72 may be first used as a gray scale and then subsequently used for sprocket holes to effect an economy in film area and/or to permit the map area 67 to be enlarged.

In FIGURE 1 the digital tracks 70 are illuminated by a narrow beam of light which is generated by a source 73 and shaped by a slit aperture 74 and then focused upon the track 70 by optical means 75. Further optical means 76 may focus incremental areas from the four digital tracks 70 of the film strip 11 upon four photo-sensitive devices 77. The photo-sensitive devices 77 may be of conventional nature, and it has been contemplated to use photo transistors in this circuit. The photo cells or photo transistors 77 will produce digital electrical signals which may be amplified by photo circuits 78 and passed to a film calibration circuit 79, FIGURE 1. The film calibration circuit 79 may include an amplifying means for passing the video signal from the divider 25 to the display console 18 and to a clearance plane computer and radio altimeter 80. The clearance plane computer and radio altimeter circuits are more fully disclosed in the Patent No. 3,031,774 Serial No. 41,564, Supra entitled "Radar Simulation" issued to Mr. Edward E. Gray, Mr. Keith E. McFarland and Mr. Kenneth R. Hackett.

FIGURE 2 illustrates more specifically the photo logic circuits 78 and the calibration amplifier 79. The photo cells or photo transistors 77 may pick-up specific digital information from the four digital tracks 70 (FIGURE 5), and the output from the photo cells is passed to digital logic circuits 82. The digital logic circuits 82 may include amplifiers for the four digital signals which will selectively pass output currents through respective relay windings 83 and 84. The video signal input from the divider 25 will appear at an input terminal 85 which is coupled to an operational amplifier 86 by at least one resistor 87 and by further resistors 88, 89, 90, 91 and 92 which will constitute selective parallel paths for current flow providing respective relay contacts 93 are closed. The operational amplifier 86 will have a high forward or open loop gain and will include a feedback resistor 95 and further possible feedback resistors 96, 97, 98, 99, 100 and 101 under control of associated relay contacts 102, 103, 104 and 105 together with a pair of diodes 106 and 107. Obviously, both the effective input resistance and the effective feedback resistance of the amplifier 86 is controlled by the relays 83 and 84 which operate in accordance with the digital information received from the film strip. The digital logic circuits 82 will include amplifiers for each of the channels and may include a sophisticated logical arrangement of AND and OR gates, but in a simpler form, the amplified signals from the photo-sensitive device 77 may be passed directly to corresponding relay windings 83 and 84. Thus, in this simple form, the indicia 71 (FIGURE 5) will directly control which of the respective ones of relays 83 and 84 will close and which others will remain open. The relays may be of a latching type, whereupon short duration signals from the photo-cells 77 will result in a holding of certain switches and resistors in the amplifier circuit.

As indicated heretofore, the function of the amplifier 86 and its associated logic and relay circuits is to modify the video signal in accordance with variations arising from the film processing. The manner in which the video signal must be modified for a specific portion of the film must be determined by a study of the film characteristics for that film portion to determine complementary characteristic curves. FIGURE 3 illustrates two possible correction curves wherein the video signal input is plotted against the desired video signal output for two assumed conditions. Obviously, further curves may be developed for other desired characteristics. Each of the curves of FIGURE 3 illustrate the amplifier output having four nearly linear segments of different slopes, and by a proper choice of input resistance and feedback resistance, the gain of the amplifier 86 will determine the slope of each line segment. Thus, the choice of the resistors 87 through 91 and 95 through 101 will permit a designer to form a desired curve (FIGURE 3) closely approximating an ideal video correction curve.

The curve to the left of the $E_0$ input voltage (FIGURE 3) corresponds to relatively low values of input voltage applied to terminal 85 (FIGURE 2) and when the input is low, the diodes 94, 106 and 107 will remain cut off whereupon certain of the resistors will not be coupled into the circuit. As the scanning beam sweeps from a low value across the film strip to a darker value of grayness, the input voltage at the terminal 85 will increase, and at a point $E_0$ the diode 94 will conduct to couple further resistors into the input circuit of the amplifier 86. As the beam continues to sweep and the video signal at the point 85 continues to increase, the output voltage at a point 109 will increase to a value $E_1$ and the diode 107 may conduct. Diodes 106 and 107 may be biased negatively from the output terminal 109 by a source negative voltage $-E$ applied through a potential dividing resistive network including resistors 110, 111 and 112 as the signal level continues to increase the diode 106 may conduct whereupon further resistors are connected into the feedback circuit of the amplifier 86.

The output video signal at terminal 109 will follow a function curve similar in form to the curves of FIGURE 3 such that as the voltage increases or decreases during a single scan of the flying spot scanner 12 the diodes 94, 106 and 107 may cut in and out depending upon the signal level. As the flying spot scanner progresses along the film strip 11 in the X or longitudinal direction, different response characteristics may be demanded because of variation in the grayness characteristics of the film whereupon the photo cells 77 will respond to the indicia 71 (FIGURE 5) causing specific relays to open and close in the input circuits and feedback circuits of the amplifier 86, and the amplifier response characteristics will change from one curve to another. In the practice of this invention, it is desirable that the film strip be analyzed as a first step and then the digital code and the appropriate resistance and diode circuits be established for the amplifier 86 to compensate for the specific film strip to be used. The number of relay switching circuits associated with the amplifier 86 may be determined as more or less than is shown in FIGURE 2 depending upon the processing variations of the film strip being used.

From the foregoing it may be appreciated that the radar display simulation apparatus continually corrects for variation in the film density or grayness, for variation in the brightness of the flying spot scanner 12, and for variation or drift in the photo-multiplier circuits. Since the drift variation of the photo-multipliers is comparatively slow as compared with the scanning rate, the feedback circuit including the memory 37 and the amplifier 38 may pass only low frequencies and direct currents. However, the analog dividing circuit 25 must be extremely fast in operation since the light intensity of the flying spot scanner 12 may vary at a 500 kilocycle rate. This circuit is contemplated to be similar to a logarithm multiplier shown and described on page 59 of "Analog Methods Computation and Simulation" by W. J. Karplus and W. W. Soroka published by McGraw-Hill Book Company, 1959. This circuit converts both inputs into logarithmic form, performs an analog subtraction, and then converts the output to the antilogarithm. Fast operation of this circuit is obtained by using only a single stage amplifier with a large feedback current. Since the amplification is accomplished in a single stage, the resulting phase shift and "roll-off" characteristics of the amplifier are minimized, and the response time is greatly reduced. The amplifier 86, for providing a film density, or H and D correction must likewise be of fast operation for passing signals and for providing diode step corrections in the video signal.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Apparatus for simulating a radar display of terrain, said apparatus comprising a photographically processed surface whereon contours are represented as shades of gray, a means for scanning the surface, a pick-up means sensitive to the scanning of the surface for generating an electrical signal corresponding to the shade of gray being scanned, said surface having digital calibration indicia corresponding to grayness variation of the photographic process of the surface, and amplifying means electrically coupled to the pick-up means and controlled by the digital calibration indicia whereby the electrical signal is calibrated to represent terrain contours.

2. Apparatus for simulating a radar display of terrain, said apparatus comprising a photographically processed film whereon contours are represented as shades of gray, a means for scanning the film with a beam of light, a photo-sensitive means positioned to receive the scanning beam and operable to generate an electrical signal corresponding to the shade of gray being scanned, said film being calibrated by photographically reproducing a standard gray scale band and thence providing a digital indication corresponding to the photographic reproduction of the band, amplifying means electrically coupled to the photo-sensitive means, and a digital pick-up means responsive to the digital indications and controllably coupled to the amplifying means whereby the electrical signal is amplified in accordance with the photographic calibration of the film.

3. In apparatus for simulating a radar display of terrain, a photographically prepared surface comprising a map area including portions of varying shades of gray representative of map contours, a gray scale area including portions of reproduced varying shades of gray corresponding with standard contours, and digital indicia positioned in spaced relation with incremental portions of the gray scale area, the arrangement of said digital indicia providing coded information corresponding to that of said standard contours, adapted for calibration of said map area.

4. Apparatus for simulating a radar display of terrain, said apparatus comprising a surface having a map area wherein shades of gray are photographically processed to represent terrain contours, a flying spot scanning means for generating a light beam to scan the surface, a photo-sensitive means receiving the scanning beam from the surface for developing an output signal in accordance with the shades of gray, a first calibration means for correcting the output signal in accordance with variations in the photographic processing of the surface, and a second calibration means for correcting the output signal in accordance with variations in the light output from the flying spot scanning means, said first calibration means including a digital representation on the surface derived from a standard gray scale photographically processed with the map area and a means for sensing the digital representation, said second calibration means including another photo-sensitive device optically positioned to receive light from the flying spot scanning means.

5. Apparatus for simulating a radar display of terrain, said apparatus comprising a surface having a map area wherein shades of gray are photographically processed to represent terrain contours, a flying spot scanning means for generating a light beam to scan the surface, a photo-multiplier for receiving the scanning beam from the surface for developing an output signal in accordance with the shades of gray, an amplifier circuit coupled to the photo-multiplier for passing the output signal, a first calibration means for correcting the output signal in accordance with variations in the photographic processing of the surface, a second calibration means for correcting the output signal in accordance with variations in the light output from the flying spot scanning means, and a third calibration means controllably coupled to the photo-multiplier for correcting the output signal in accordance with drift variations of the photo-multiplier, said first calibration means including a digital representation on the surface derived from a standard gray scale photographically processed together with the map area and a means for sensing the digital representation controllably coupled to the amplifying means, said second calibration means including another photo-multiplier optically positioned to receive light from the flying spot scanning means and controllably coupled to the amplifying means, said third calibration means including a standard light source and optical means for periodically applying the standard light source to the photo multipliers for correcting drift variations therein.

6. Apparatus for simulating a radar display of terrain, said apparatus comprising a photographically processed film whereon contours are represented as shades of gray, a means for scanning the film with a beam of light, a photo-sensitive means positioned to receive the scanning beam and operable to generate an electrical signal corresponding to the shade of gray being scanned, said film being calibrated by photographically reproducing a standard gray scale band and thence providing a digital indication corresponding to the photographic reproduction of the band, amplifying means electrically coupled to the the photo-sensitive means, said amplifying means including a plurality of impedance elements for passing input signals and a further plurality of impedance elements for passing feedback signals, and a digital pick-up means responsive to the digital indications and controllably coupled to the amplifying means, said amplifying means further including switching means controllably coupled to the impedance devices and responsively coupled to the pick-up means whereby the digital indications cause operation of the switching means and selectively establish an input and a feedback circuit to provide desired characteristics in the amplifier in accordance with the photographic calibration of the film.

7. Apparatus for simulating a radar display of terrain, said apparatus comprising a photographically processed film whereon contours are represented as shades of gray, a means for scanning the film with a beam of light, a photo-sensitive means positioned to receive the scanning beam and operable to generate an electrical signal corresponding to the shade of gray being scanned, said film being calibrated by photographically reproducing a standand gray scale band and thence providing a digital indication corresponding to the photographic reproduction of the band, amplifying means electrically coupled to the photo-sensitive means, said amplifying means including a plurality of resistance elements for passing input signals and a further plurality of resistance elements for passing feedback signals, and a digital pick-up means responsive to the digital indications and controllably coupled to the amplifying means, said amplifying means further including selective switching means controllably coupled to the resistance elements and responsively coupled to the digital pickup means, said amplifying means further including at least one unidirectional conduction device coupled to one of the resistance elements and operable to connect the resistance element into the amplifying circuit only when the signal attains a pre-determined level whereby the electrical signal is amplified in accordance with the photographic calibration of the film.

References Cited in the file of this patent

UNITED STATES PATENTS

| | | |
|---|---|---|
| 2,230,149 | Weddington | Jan. 28, 1941 |
| 2,563,892 | Waller | Aug. 14, 1951 |
| 2,603,912 | Gruber | July 22, 1952 |
| 2,720,039 | Brown | Oct. 11, 1955 |
| 2,737,730 | Spencer | Mar. 13, 1956 |
| 2,783,454 | North | Feb. 26, 1957 |
| 2,788,588 | Lindley | Apr. 16, 1957 |
| 2,870,548 | Chedister | Jan. 27, 1957 |